United States Patent
Terada et al.

(10) Patent No.: US 9,227,470 B2
(45) Date of Patent: Jan. 5, 2016

(54) TIRE PRESSURE MONITORING SYSTEM

(71) Applicant: NISSAN MOTOR CO., LTD., Kanagawa (JP)

(72) Inventors: Syoji Terada, Hiratsuka (JP); Kazuo Sakaguchi, Ebina (JP); Takashi Shima, Milton Keynes (GB)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 0 days.

(21) Appl. No.: 14/372,369

(22) PCT Filed: Mar. 6, 2013

(86) PCT No.: PCT/JP2013/056098
§ 371 (c)(1),
(2) Date: Jul. 15, 2014

(87) PCT Pub. No.: WO2013/133311
PCT Pub. Date: Sep. 12, 2013

(65) Prior Publication Data
US 2014/0354420 A1 Dec. 4, 2014

(30) Foreign Application Priority Data

Mar. 9, 2012 (JP) ................................. 2012-053814
Mar. 9, 2012 (JP) ................................. 2012-053819

(51) Int. Cl.
*B60C 23/00* (2006.01)
*B60C 23/04* (2006.01)

(52) U.S. Cl.
CPC ............. *B60C 23/0484* (2013.01); *B60C 23/04* (2013.01); *B60C 23/0401* (2013.01); *B60C 23/0408* (2013.01); *B60C 23/0416* (2013.01); *B60C 23/0488* (2013.01)

(58) Field of Classification Search
CPC .................................................. B60C 23/0484
See application file for complete search history.

(56) References Cited

U.S. PATENT DOCUMENTS

| 8,674,821 B2* | 3/2014 | Togawa ............... B60C 23/0484 340/442 |
| 8,823,505 B2* | 9/2014 | Maekawa ............ B60C 23/0408 340/442 |
| 9,019,094 B2* | 4/2015 | Schwab .............. B60C 23/0457 340/447 |
| 2004/0046651 A1 | 3/2004 | Norimatsu |
| 2007/0113635 A1 | 5/2007 | Corniot |

(Continued)

FOREIGN PATENT DOCUMENTS

| JP | 2004098835 A | 4/2004 |
| JP | 2007513014 A | 5/2007 |

(Continued)

*Primary Examiner* — Van Trieu
(74) *Attorney, Agent, or Firm* — Young Basile

(57) ABSTRACT

A tire pressure monitoring system has a first abnormality determination means for determining a state to be normal, the normal state being when the front wheel air pressure is higher than a front wheel warning threshold 400 kPa and the rear wheel tire pressure is higher than a rear wheel warning threshold 240 kPa. The first abnormality determination means also turns on a warning light in the state. A second abnormality determination means turns the warning light to an off state regardless of the determination result of the first abnormality determination means when the warning light is turned off while the vehicle is stopped, the tire pressures of two wheels have been determined to be higher than the front wheel warning threshold 400 kPa, and the tire pressures of the remaining two wheels have been determined to be higher than the rear wheel warning threshold 240 kPa.

5 Claims, 4 Drawing Sheets

(56) References Cited

U.S. PATENT DOCUMENTS

2010/0066521 A1 3/2010 Yoshida
2012/0044064 A1* 2/2012 Maekawa ............ B60C 23/0408
340/447

FOREIGN PATENT DOCUMENTS

| JP | 2007176218 A | 7/2007 |
| JP | 2008126959 A | 6/2008 |

* cited by examiner

BEFORE TIRE ROTATION

AIR PRESSURE PROPERLY ADJUSTED
AFTER TIRE ROTATION

TIRE PRESSURE MONITORING SYSTEM

CROSS REFERENCE TO RELATED APPLICATIONS

The present application claims priority to Japanese Patent Application Nos. 2012-053814, filed Mar. 9, 2012; and 2012-053819, filed Mar. 9, 2012, each incorporated herein in its entirety.

TECHNICAL FIELD

The present invention relates to a tire pressure monitoring system.

BACKGROUND

In JP Patent Application Publication No. 2008-126959 A, a technique is disclosed in which, if the tire pressure indicates a predetermined percentage decrease from a recommended air pressure, a warning lamp is turned on and lit in order to prompt or encourage the driver to travel with the recommended air pressure.

However, in the prior art technique, in a case in which a vehicle recommended air pressure is different between the front and rear wheels, when the driver has adjusted the tire pressure of each tire after a tire rotation, the warning lamp will be lit until a tire location is completed and the correspondence between each sensor unit and a wheel position will be updated. Thus, during this time, the driver will be given with a sense of discomfort.

BRIEF SUMMARY

The object of the present invention resides in providing a tire pressure monitoring system to prevent a warning light or lamp from being lit during a proper air pressure adjustment is performed after a tire rotation process for a vehicle in which a recommended tire pressure is differently specified between the front and rear wheels.

In order to achieve the above object, in the present invention, when the warning lamp is turned off or in an off state during a vehicle stop, and when the tire pressures of two wheels are equal to or greater than a higher value out of a front wheel threshold and a rear wheel threshold while the tire pressures for the remaining two wheels are equal to or greater than a lower value out of the front wheel threshold and the rear wheel threshold, the off state of the warning lamp will be continued, regardless of the determination result of a first abnormality determination unit.

In a case in which the warning lamp is in an off state during a vehicle stop, and when the tire pressures of two wheels are equal to or greater than a higher value out of a front wheel threshold and a rear wheel while the tire pressures for the remaining two wheels are equal to or greater than a lower value out of the front wheel threshold and the rear wheel threshold, the possibility that an air pressure adjustment after a tire rotation has taken place is considered high. Thus, in this case, by continuing the light-out or off state of the warning lamp, it is possible to prevent lighting of the warning lamp during the tire location process.

DETAILED DESCRIPTION OF THE EMBODIMENTS

In the following, the embodiments will be described with reference to the drawings to carry out the present invention.

Figure 1:
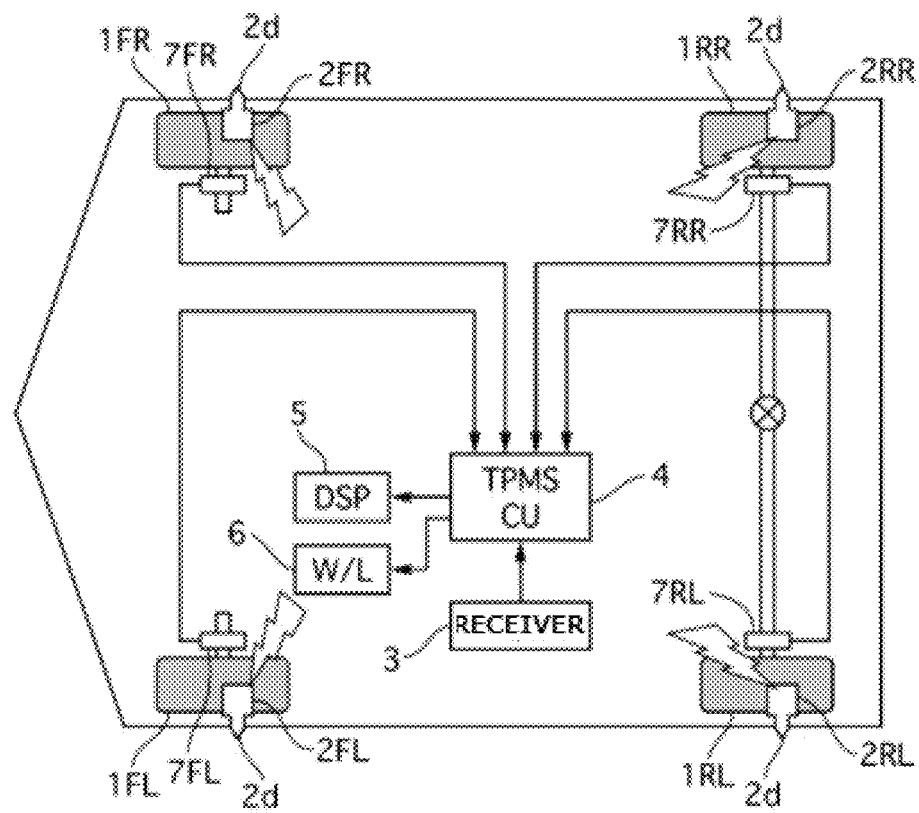
FIG. 1 is a block diagram of a tire pressure monitoring device in the first embodiment.

FIG. 1 is a configuration diagram illustrating a tire air or pneumatic pressure monitoring system in a first embodiment. In the figure, the end letters annexed to each reference numeral is intended to indicate as follows: FL stands for the left front wheel, FR stands for the right front wheel, RL stands for the left rear wheel, and RR stands for the right rear wheel, respectively. In the following description, when not specifically necessary, the description of FL, FR, RL and RR will be omitted.

The tire pressure monitoring device in the first embodiment is provided with a TPMS (Tire Pressure Monitoring System) sensor 2, a receiver 3, a TPMS control unit (TPMSCU) 4, a display 5, a warning lamp 6, and a vehicle wheel speed sensor 7. The TPMS sensor 2 is mounted on each wheel 1. The receiver 3, the TPMSCU 4, the display 5, the warning lamp 6, and the wheel speed sensor are mounted on the side of vehicle body.

Figure 2:
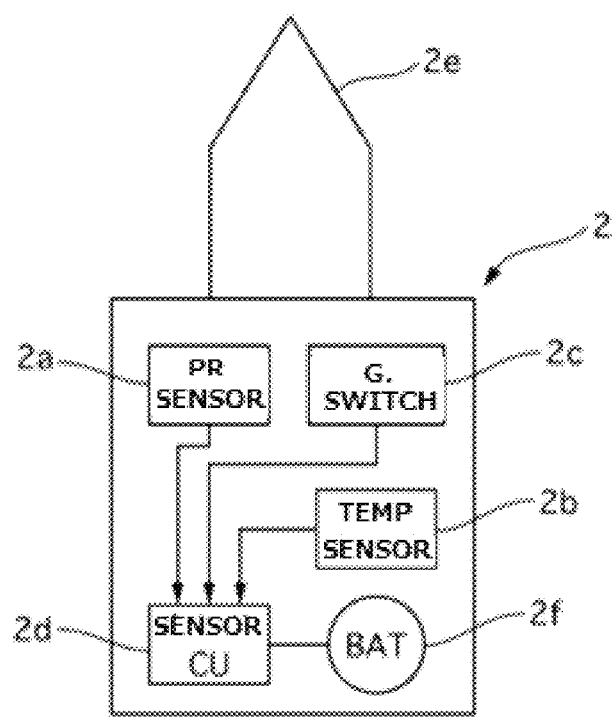
FIG. 2 is a diagram of a configuration of TPMS sensor 2 in the first embodiment.

The TPMS sensor 2 is mounted in an air valve of the tire (not shown). FIG. 2 is a configuration diagram of a TPMS sensor 2 in the first embodiment. The TPMS sensor 2 is provided with a pressure sensor (air pressure detecting means) 2a, a temperature sensor 2b, an acceleration switch (G switch) 2c, a sensor control unit (sensor CU) 2d, a transmitter 2e, and a button battery 2f. The pressure sensors 2a detect the tire pressure kPa. The Temperature sensor 2b detects the temperature of the air in the tire [° C.].

The G switch 2c is a switch which turns OFF when the centrifugal direction acceleration [g] acting on the tire is less than a predetermined value and turns ON when the acceleration is equal to the predetermined value or more. The sensor CU2d is operated by power from button battery 2f and sends from a transmitter 2 TPMS data by radio signal air pressure information of the tire detected by the pressure sensor 2a, temperature information in the tire detected by the temperature sensor 2b, and a sensor ID (identification information).

The sensor CU2d, triggered by an ON/OFF of the G switches 2c, stops sending TPMS data at a very low vehicle speed range including a stopped state (i.e., G switch OFF) and sends the TPMS date at predetermined intervals (for example, 1-minute intervals) at a vehicle speed range higher (i.e., G switch ON). The receiver 3 receives the wireless or radio signal output from each TPMS sensor 2, and outputs to the TPMSCU4 after decoding.

The TPMSCU4 reads each TPMS data, and, based on the sensor ID contained in the TPMS data, to which wheel position the TPMS data is associated with by referring to the correspondence relationship between each wheel position and the sensor ID stored in the internal memory in advance. The TPMSCU4 then displays on the display 5 the air pressure of the wheel position as that corresponding to the air pressure contained in the TPMS data. In addition, when the tire pressure has dropped more than a predetermined ratio from the recommended air pressure (20%, for example), the warning lamp 6 is caused to turned ON to warn of the air pressure decrease to prompt the driver to travel at the proper air pressure. In the embodiment, the recommended air pressure in the front wheel is set at 500 kPa, and the recommended air pressure in the rear front wheel is set to 300 kPa, respectively. The wheel speed sensor 7 is respectively provided corresponding to each wheel and produces a wheel speed pulses in accordance with the wheel speed. The TPMSCU4 calculates a travelling or running speed of the vehicle (vehicle speed) from the wheel speed pulses.

As described above, since the TPMSCU4 determines, based on the correlation between the sensor ID that is stored in the internal memory and each of the wheel positions, to the data of which wheel the received TPMS data belong, if a tire rotation takes place during the vehicle stop, the TPMSCU4 cannot determine the TPMS data is associated to any wheel since the correspondence between each stored sensor ID and each wheel position does not match the actual correspondence any more. Note that the "Tire Rotation" refers changing the mounting position of the tire to obtain a uniform tread wear of the tire and extend the life (tread life). For example, in a passenger car, in general, the front tires are moved to the rear and the rear to the front with the left and right positions crossed.

Thus, in the first embodiment, in order to register a storage update to the memory 9 regarding the relationship between each wheel position and each sensor ID after the tire rotation, if the possibility of the tire rotation has been confirmed, an auto-location will be performed in the TPMSCU4 to determine each TPMS sensor 2 is associated or paired to any wheel.

The TPMSCU4 determines that there is a possibility that the tire rotation has been performed if a predetermined time (e.g., 15 minutes) has elapsed from an ignition switch being OFF to ON.

If the elapsed time between the ignition OFF and the ignition ON is less than the predetermined time, the TPMSCU4 performs a "Monitoring mode" in which the tire pressure of each wheel 1 is monitored based on the air pressure information in the TPMS data transmitted from each TPMS sensor 2. On the other hand, if the elapsed time between the ignition OFF and the ignition ON is equal to or greater than the predetermined time, an "Auto-location Mode" mode is determined and the wheel position of each TPMS sensor 2 is determined. The Auto-location mode will be carried out until the wheel positions of all TPMS sensors 2 will be determined, and, when the wheel positions of all TPMS sensors 2 have been determined, control shifts to the Monitor mode. The determination of the wheel positions of the TPMS sensor 2 can be made using the strength (field intensity, field strength) of the radio signal from the TPMS sensor 2 or other known method.

Since the monitoring of the tire pressure is available based on the air pressure information contained in the TPMS data even during the Auto-location mode, display of the air pressure by display 5 and a warning of an air pressure drop by the warning lamp 6 are performed, during the Auto-location mode, based on the correspondence between each sensor ID currently stored and each wheel position.

At this time, in order to prevent the warning lamp 6 from being lit erroneously despite the state in which a proper air pressure adjustment has been performed after the rotation, the TPMSCU4 in the first embodiment performs a control to prevent an erroneous lightning of the warning lamp. In order to realize an erroneous lighting preventive control, of the warning lamp, each time the vehicle is stopped, the TPMSCU4 stores the lighting state of the warning lamp 6, the tire pressure as well as the air temperature of each wheel which have most recently been received.

Figure 3:
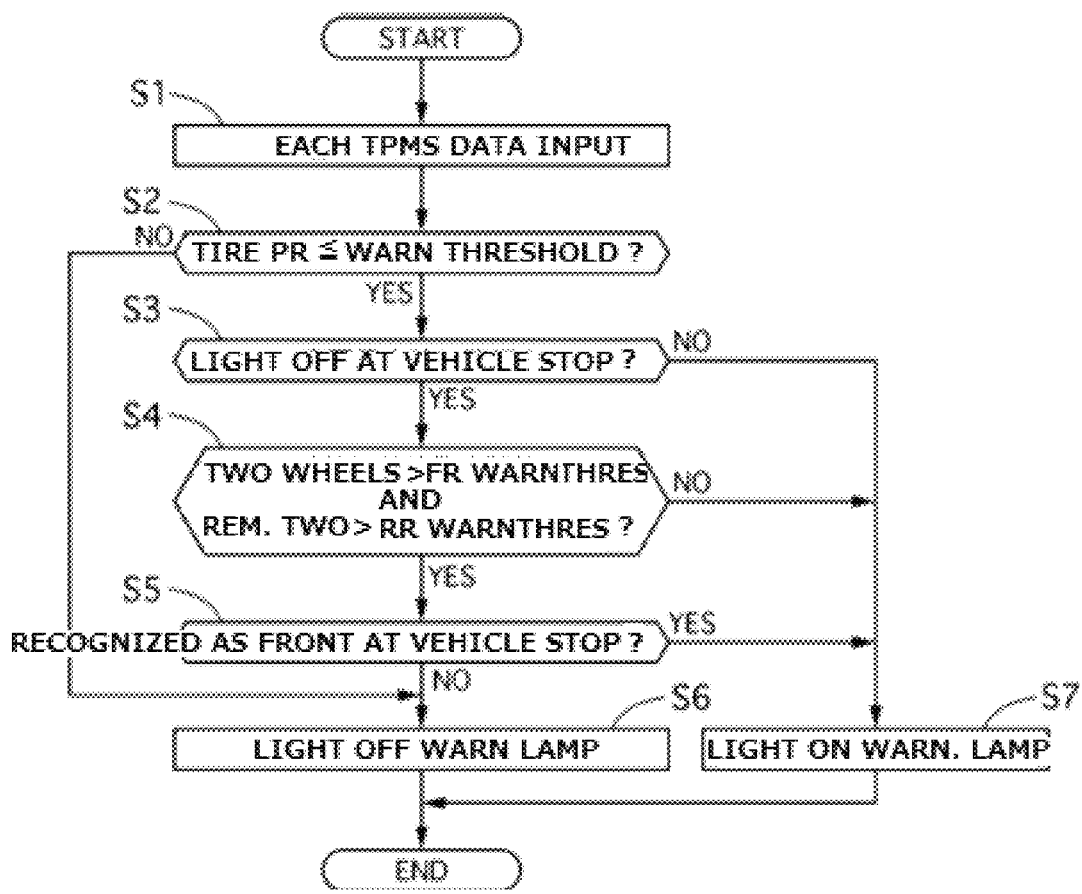
FIG. 3 is a flowchart showing a flow of an erroneous lighting preventive control for preventing an erroneous lightning of warning lamp performed by TPMSCU4 in the first embodiment.

FIG. 3 is a flowchart showing a flow of an erroneous lighting preventive control for warning lamp performed by TPMSCU4 in the first embodiment. Below, each step will be described. In step S1, each TPMS data is input and the tire pressure of each wheel is read.

In step S2, a determination is made whether or not the tire pressure in the front wheel tire is equal to 400 kPa, a front wheel threshold value of the warning threshold (i.e. front wheel threshold value obtained by multiplying the recommended front wheel air pressure value by 80 percent), or the tire pressure in the rear wheel tire is equal to 240 kPa, a rear wheel threshold value of the warning threshold (i.e. rear wheel threshold value obtained by multiplying the recommended rear wheel air pressure value by 80 percent). If determined YES, control proceeds to step S3, and if NO, the control proceeds to step S6. Note that step S2 corresponding to the first abnormality determination means.

In step S3, it is determined whether or not the warning lamp 6 is in OFF state during the vehicle stopped state, the process proceeds to step S4 if YES, while the process proceeds to step S7 in the case of NO.

In step S4, it is determined whether or not the tire pressures of two wheels are higher than the front wheel warning threshold 400 kPa and the tire pressures of the remaining two wheels are higher than a rear wheel warning threshold 240 kPa, and if YES, control proceeds to step S5 while, if NO, control proceeds to step S7. The steps S3 and S4 correspond to the second abnormality determination means.

In step S5, it is determined whether or not the two wheels with which the tire pressures are determined to be higher than the front wheel warning threshold 400 kPa in step S4, are recognized as the front wheels during the vehicle stopped state. In other words, it is determined whether or not the wheel positions of the transmitters 2d corresponding to the two wheels have been determined as the front wheels, and if YES, control proceeds to step S7 while, if NO, control proceeds to step S6. The step S5 corresponds to the third abnormality determination means. In step S6, the warning lamp 6 is turned OFF. In step S7, the warning lamp 6 is turned ON.

Figure 4A:
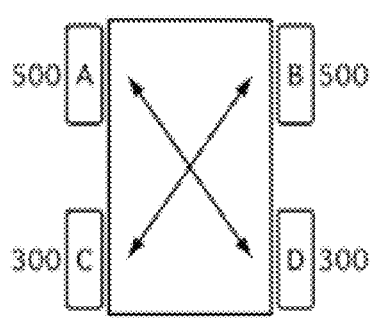
FIGS. 4A and 4B are explanatory diagrams showing the operation for the preventive control for preventing an erroneous lighting of warning lamp 6 in the first embodiment, before rotation in FIG. 4A and after rotation in FIG. 4B.

Now, a description is given of the operation As shown in FIG. 4(a), the vehicle in the first embodiment represents a vehicle with different pressure between the front and rear in which the recommended air pressure for the front wheels is set at 500 kPa, and the recommended air pressure for the rear wheels are set to 300 kPa, respectively. Thus, the warning threshold value in the front wheel (recommended air pressure×80%) is set at 400 kPa and that in the rear is set at 240 kPa, respectively.

Note that the sensor IDs of the TPMS sensors respectively associated with left front wheel 1FL, right front wheel 1FR, left rear wheel 1RL and right rear wheel 1RR before the tire rotation are identified as A, B, C, and D, respectively.

If the tire pressure before the tire rotation is at the recommended air pressure, when doing the tire rotation b changing between the front and rear wheels with the left and right positions being crossed, the tire pressure in the left and right front wheels are insufficient by 200 kPa while the tire pressure in the left and right rear wheels exceeds the recommended air pressure by 200 kPa. Thus, the driver will adjust each tire pressure so that the recommended air pressure is achieved (FIG. 4(b)).

Thereafter, when the vehicle is started with the driver turning ON the ignition switch, if the elapsed time from the ignition OFF to the ignition ON is a predetermined time or more, although the TPMSCU4 proceeds to the Auto-location Mode, since monitoring of each tire pressure is continued to be monitored, the TPMSCU4 determines that the tire pressures associated with the sensor IDs, A, B are equal to the front wheel warning threshold 400 kPa or less based on the correspondence currently stored with respect to each sensor ID and each wheel position (A: left front wheel, B: right front wheel, C: left rear wheel, D: right rear wheel).] At this time, in the prior art technique, while correspondence between each sensor ID and the wheel position is being updated by the Auto-location procedure, the warning lamp is turned on. Since the driver has adjusted the tire pressure to the recommended pressure, the lighting of the warning lamp would give discomfort to the driver.

In contrast, in the first embodiment, when the warning lamp is determined in step S3 in an off state during a vehicle stopped state, and when the tire pressures of two wheels are equal to or greater than a front wheel warning threshold 400 kPa and the tire pressures of the remaining two wheels are equal to greater than a rear wheel warning threshold 240 kPa the off state or extinguished state of the warning lamp will be continued regardless of the determination result in step S2.

In other words, during a vehicle stopped state, when the warning lamp is in an off state, a determination is made that the tire pressures of two wheels are higher than the warning threshold 400 kPa in the front wheels, and that the air pressures of the remaining two wheels are higher than the warning threshold 240 kPa in the rear wheels. Stated differently, when a determination is made, during a vehicle stopped state, that the tire pressures of two wheels are in the vicinity of a recommended air pressure 500 kPa and that the tire pressures of the remaining two wheels are in the vicinity of a recommended air pressure 300 kPa, the possibility that the air pressure adjustment has been performed after tire rotation is held high so that, by continuing the off state of the warning lamp 6, the lighting of the warning lamp 6 may be inhibited during the tire location period.

Figure 4B:
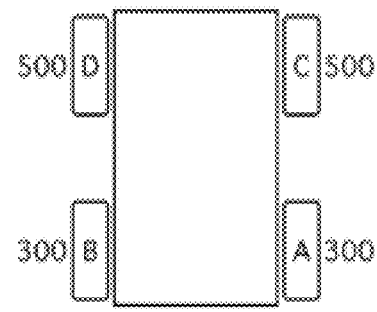

Thus, in the case of FIG. 4(b), the tire pressures of the left and right rear wheels corresponding to the sensor ID A, B are higher than the rear wheel warning threshold 240 kPa, and the tire pressures of the left and right front wheels corresponding to the sensor ID C, D are higher than the front wheel warning threshold 400 kPa. In other words, since the tire pressures of the left and right rear wheels corresponding to the sensor ID A, B are in the vicinity of the recommended rear wheel air pressure 300 kPa and the air pressures of the left and right front wheels corresponding to the sensor ID C, D are in the vicinity of the recommended front wheel air pressure 500 kPa, the warning lamp 6 will not be lit so that it is possible to give a feeling of discomfort to the driver.

In the case in which the warning lamp 6 is lit when the vehicle stops, the warning lamp 6 will be turned on. However, in this case, since the driver knows the air pressure drop, it does not give a sense of discomfort to the driver. Further, even when the warning lamp 6 is lit when the vehicle stops, when the tire pressures of two wheels are higher than the front wheel warning threshold 400 kPa and the tire pressures of the remaining two wheels are higher than the rear wheel warning threshold 240 kPa, i.e., when the tire pressures of two wheels are in the vicinity of the recommended front wheel air pressure 500 kPa and the tire pressures of the remaining two wheels are in the vicinity of the recommended rear wheel warning threshold 300 kPa, if the warning lamp 6 would be configured not to be lit, then the warning lamp 6 would not be lit during a tire location process even when the driver has not performed a proper air pressure adjustment after a vehicle stop in response to a warning that had been made before the vehicle stop. Thus, the driver would not be prompted to travel at the recommended air pressure. That is, by considering the lighting state of the warning lamp 6 when the vehicle stops, in response to a state in which proper treatment is not performed when the vehicle stops for a decreased air pressure occurring before the vehicle stop, it is possible to prevent the warning lamp 6 from being extinguished during the tire location so that the driver may be prompted continuously to travel at the recommended air pressure.

In the first embodiment, in step S5, when the two wheels the tire pressure of which have been determined higher than a front wheel warning threshold 400 kPa in step S4 have been recognized as the front wheels during the vehicle stopped state, i.e., the wheels are those for which the warning threshold 400 kPa has been set, irrespective the outcome of determination in step S4, the warning lamp 6 will be lit. When each tire pressure is properly adjusted after the tire rotation during a vehicle stop, since the tire pressure for left and right wheels is set at 500 kPa and the tire pressure for the left and right rear wheels is set at 300 kPa, respectively, the two wheels which have been higher in tire pressure than the front wheel warning threshold 400 kPa, i.e., the two wheels the tire pressures of which have been determined to be in the vicinity of the recommended air pressure 500 kPa should have been the rear wheels before the tire rotation so that they should have been recognized as the rear wheels during the vehicle stop. Therefore, if both wheels are those which have been recognized as front wheels at the vehicle stop, since no proper air pressure adjustment has been performed after the tire rotation, by energizing to light the warning lamp 6 in this case, the drive may be facilitated to travel at the recommended air pressure.

Now, the effect will be described. In the tire pressure monitoring system in the first embodiment, the following effects may be achieved.

(1) Provided are a pressure sensor 2a to detect a tire pressure, a first abnormality determination means (S2) that determines a state to be normal in which the air pressures of the front wheels are higher than a front wheel warning threshold 400 kPa and the air pressures of the rear wheels are higher than a rear wheel warning threshold 240 kPa and that is configured to light a warning lamp 6 in the other state, and a second abnormality determination means (S3, S4) that is configured, when the warning lamp 6 is in an off or extinguished state, to continue the off state of the warning lamp 6 regardless of the determination result of the first abnormality determination means, when the tire pressures of two wheels have been determined to be higher than the front wheel warning threshold 400 kPa and the tire pressures of the remaining two wheels have been determined to be higher than the rear wheel warning threshold 240 kPa.

During a vehicle stopped state, when the warning lamp is in an off state, a determination is made that the tire pressures of two wheels are higher than the warning threshold 400 kPa in the front wheels and that the air pressures of the remaining two wheels are higher than the warning threshold 240 kPa in the rear wheels, the possibility that an air pressure adjustment has been performed after a tire rotation is held high so that, by continuing the off state of the warning lamp 6, the lighting of the warning lamp 6 may be inhibited during the tire location period to thereby prevent the driver from being given with a feel of discomfort. Further, in response to a state in which proper treatment is not performed by the driver when the vehicle stops for a decreased air pressure occurring before the vehicle stop, it is possible to prevent the warning lamp 6 from being extinguished during the tire location so that the driver may be prompted continuously to travel at the recommended air pressure.

(2) Provided are a pressure sensor 2a to detect a tire pressure, a first abnormality determination means (S2) that determines a state to be normal in which the air pressures of the front wheels are higher than a front wheel warning threshold 400 kPa and the air pressures of the rear wheels are higher than a rear wheel warning threshold 240 kPa and that is configured to light a warning lamp 6 in the other state, and a second abnormality determination means (S3, S4) that is configured, when the warning lamp 6 is in an off or extinguished state, to continue the off state of the warning lamp 6 regardless of the determination result of the first abnormality determination means, when the tire pressures of two wheels have been determined in the vicinity of a recommended front wheel pressure 500 kPa and the tire pressures of the remaining two wheels have been determined in the vicinity of a recommended rear wheel pressure 300 kPa.

When a determination is made, during a vehicle stopped state, that the tire pressures of two wheels are in the vicinity of a recommended air pressure 500 kPa and that the tire pressures of the remaining two wheels are in the vicinity of a recommended air pressure 300 kPa, the possibility that the air pressure adjustment has been performed after the tire rotation is held high so that, by continuing the off state of the warning lamp 6, the lighting of the warning lamp 6 may be inhibited during the tire location period to thereby prevent the driver from being given with a feel of discomfort.

Further, in response to a state in which proper treatment is not performed by the driver when the vehicle stops for a decreased air pressure occurring before the vehicle stop, it is possible to prevent the warning lamp 6 from being extinguished during the tire location so that the driver may be prompted continuously to travel at the recommended air pressure.

(3) Further provided is a third abnormality determination means (S5) that is configured to light the warning lamp 6 regardless of the determination result of the second abnormality determination means, when the two wheels the tire pressure of which have been determined higher than a front wheel warning threshold 400 kPa have been recognized as the front wheels for which the front wheel warning threshold 400 kPa has been set during the vehicle stopped state.

When each tire pressure is properly adjusted after the tire rotation during a vehicle stop, since the tire pressure for left and right wheels is set at 500 kPa and the tire pressure for the left and right rear wheels is set at 300 kPa, respectively, the two wheels which have been higher in tire pressure than the front wheel warning threshold 400 kPa should have been the rear wheels before the tire rotation so that they should have been recognized as the rear wheels during the vehicle stop. Therefore, if both wheels are those which have been recognized as front wheels at the vehicle stop, since no proper air pressure adjustment has been performed after the tire rotation, by energizing to light the warning lamp 6 in this case, the drive may be facilitated to travel at the recommended air pressure.

Further provided is a third abnormality determination means (S5) that is configured to light the warning lamp 6 regardless of the determination result of the second abnormality determination means, when the two wheels the tire pressure of which have been determined in the vicinity of a recommended front wheel pressure 500 kPa have been recognized as the front wheels.

When each tire pressure is properly adjusted after the tire rotation during a vehicle stop, since the tire pressure for the left and right wheels is set at 500 kPa and the tire pressure for the left and right rear wheels is set at 300 kPa, respectively, the two wheels which have been determined in the vicinity of the recommended front wheel tire pressure 500 kPa should have been the rear wheels before the tire rotation so that they should have been recognized as the rear wheels during the vehicle stop. Therefore, if both wheels are those which have been recognized as front wheels at the vehicle stop, since no proper air pressure adjustment has been performed after the tire rotation, by energizing to light the warning lamp 6 in this case, the drive may be facilitated to travel at the recommended air pressure.

As described by way of embodiments with reference to the drawings, the best mode for carrying out the present invention is described. However, the specific configuration of the invention is not intended to be limited to the embodiments. Rather, any design modifications that would not depart from the scope of the invention may be included in the present invention.

For example, in the embodiment, a description has been given of a vehicle in which the front threshold is greater than the rear threshold. However, the invention is applicable to a vehicle in which the rear threshold is greater than the front threshold with the similar operational effects obtained.

In the embodiment, the recommended air pressure and the warning threshold (80% of the recommended pressure) are respectively set to be constant. They may be varied according to the air temperature in the tire. Recommended pressure Pwarm during a vehicle travel can be expressed as the following equation by using the law of Boyle-Charles.

$$P\text{warm} = T\text{warm} \times P\text{cold} / T\text{cold}$$

Note that Twarm denotes an air temperature in the tire during vehicle travel, Pcold denotes a placard pressure, Tcold denotes a temperature of the tire at the time at which the driver adjusts the tire pressure to the placard pressure (cold state). By setting the recommended air pressure, the warning threshold may be set variable depending on the air temperature in the tire.

The invention claimed is:
1. A tire pressure monitoring system comprising:
a pressure sensor for each tire to detect a tire pressure of an associated tire;
an abnormality determination means that determines, during a vehicle stop with an ignition switch being on, a normal state in which air pressures of front wheels are higher than a front wheel warning threshold and the air pressures of rear wheels are higher than a rear wheel warning threshold different from the front wheel warning threshold, and that otherwise determines an abnormal state;
a lamp lighting means that is configured to turn off a warning lamp when the normal state is determined and to turn on the warning lamp when the abnormal state is determined; and
a controller configured to perform a preventative control to prevent the warning light from being erroneously lit when the ignition switch is turned on subsequent to being turned off during the vehicle stop and the abnormal state is determined when the ignition switch is turned on, by:
when the warning lamp has been in an off state during the vehicle stop, and when the tire pressures of two wheels are higher than a higher value of the front wheel threshold and the rear wheel threshold, and the tire pressures of a remaining two wheels are higher than a lower value of the front wheel threshold and the rear wheel threshold, determining the abnormal state may be due to a tire rotation and signaling the lamp lighting means to keep off the warning lamp;

determining if the warning lamp has been in an on state during the vehicle stop prior to the ignition switch being turned on;

if so, signaling the lamp lighting means to turn on the warning lamp; and if not, determining the abnormal state is due to a tire rotation and signaling the lamp lighting means to keep off the warning lamp.

2. The tire pressure monitoring system as claimed in claim 1, further comprising:

a tire location means which performs a tire location by registering a correspondence between each pressure sensor and each wheel position by updating a storage memory, wherein the controller is configured to perform the erroneous lighting preventive control while the tire location is being performed.

3. A tire pressure monitoring system for a four wheeled vehicle comprising:

a pressure sensor for each tire to detect a tire pressure of an associated tire;

an abnormality determination means that determines, during a vehicle stop with an ignition switch being on, a normal state in which the air pressures of two front wheels are higher than a front wheel threshold set lower than a recommended front wheel air pressure and the air pressures of two rear wheels are higher than a rear wheel threshold set lower than a recommended rear wheel air pressure and different from the front wheel threshold, and that is configured to otherwise determine an abnormal state;

a lamp lighting means that is configured to turn off a warning lamp when the normal state is determined and to turn on the warning lamp when the abnormal state is determined; and a controller configured to perform a preventative control to prevent the warning light from being erroneously lit when an ignition switch is turned on subsequent to being turned off during the vehicle stop and the abnormal state is determined by the abnormality determination means, by:

when the warning lamp is in an off state during the vehicle stop, and when the tire pressures of two wheels are higher than a higher value of the front wheel threshold and the rear wheel threshold and the tire pressures of a remaining two wheels are higher than a lower value of the front wheel threshold and the rear wheel threshold, determining the abnormal state may be due to a tire rotation and signaling the lamp lighting means to keep off the warning lamp.

4. The tire pressure monitoring system as claimed in claim 3, wherein the controller is further configured to:

determine if the two wheels with the tire pressure determined to be in the vicinity of the recommended front wheel tire pressure have been recognized as the front wheels during the vehicle stop; and is so, signal the lamp lighting means to turn on the warning lamp; and if not, determine the abnormal state is due to a tire rotation and signal the lamp lighting means to keep off the warning lamp.

5. The tire pressure monitoring system as claimed in claim 3, further comprising:

a tire location means which performs a tire location by registering a correspondence between each pressure sensor and each wheel position by updating a storage memory, wherein the controller is configured to perform the erroneous lighting preventive control while the tire location is being performed.

\* \* \* \* \*